United States Patent
Ta

[11] Patent Number: 5,880,757
[45] Date of Patent: *Mar. 9, 1999

[54] PRINT RESOLUTION ENHANCEMENT BY ADJUSTING PRINTHEAD POSITION

[75] Inventor: Chuong C. Ta, San Diego, Calif.

[73] Assignee: Hewlett-Packard Company, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 711,573

[22] Filed: Sep. 10, 1996

Related U.S. Application Data

[63] Continuation-in-part of Ser. No. 556,728, Nov. 13, 1995, which is a continuation of Ser. No. 787,297, Nov. 4, 1991, Pat. No. 5,488,397.

[51] Int. Cl.⁶ ..................................................... B41J 2/145
[52] U.S. Cl. .................. 347/40; 347/41; 347/42
[58] Field of Search ................. 347/40, 41, 42, 347/49, 43

[56] References Cited

U.S. PATENT DOCUMENTS

| | | | |
|---|---|---|---|
| 4,400,101 | 8/1983 | Hendrischk | 400/124 |
| 4,470,713 | 9/1984 | Rossopoulos | 400/124 |
| 4,743,927 | 5/1988 | Sasaki | 347/130 |
| 4,748,453 | 5/1988 | Lin et al. | 347/41 |
| 4,774,529 | 9/1988 | Paranjpe et al. | 346/140 |
| 5,250,956 | 10/1993 | Haselby et al. | 347/40 X |
| 5,297,017 | 3/1994 | Haselby et al. | 347/40 X |

FOREIGN PATENT DOCUMENTS

| 53-89739 | 8/1978 | Japan | 347/43 |
|---|---|---|---|

*Primary Examiner*—N. Le
*Assistant Examiner*—C. Dickens

[57] ABSTRACT

A swath type printer including a print carriage supported printhead and a printhead positioning mechanism for adjusting the position of the printhead relative to the media axis at the end of each scan of the carriage along a carriage axis, such that dots printed by printing elements of the printhead in a sequence of a first scan and a second scan of the print carriage are interleaved along the media axis and are separated along the media axis by one-half of the predetermined printing element dot pitch.

8 Claims, 4 Drawing Sheets

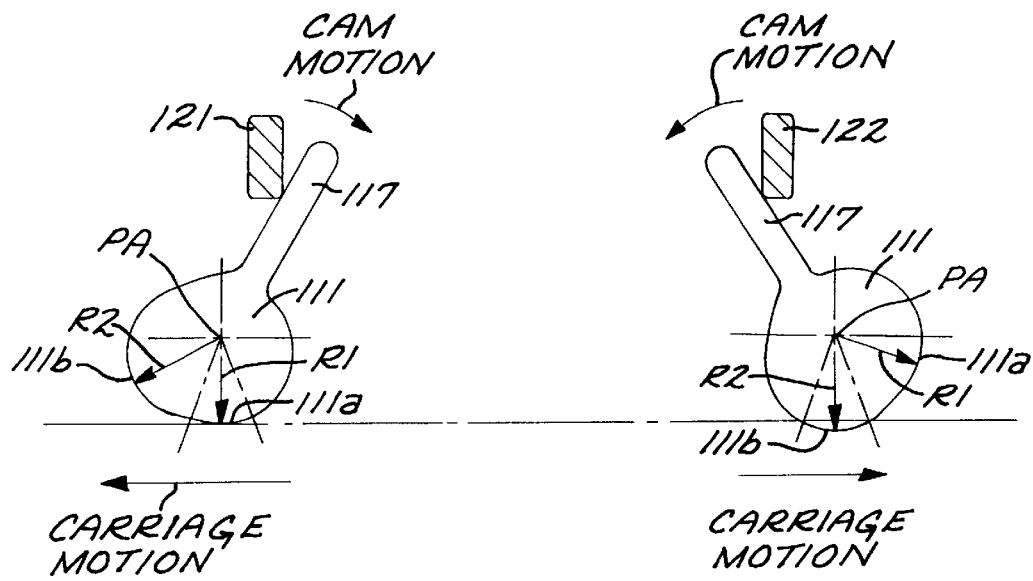
FIG.6A   FIG.6B
FIG.7
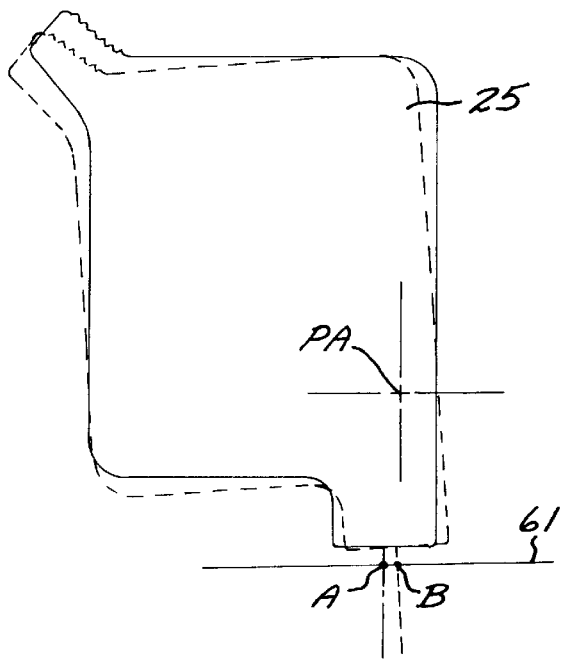
FIG.8
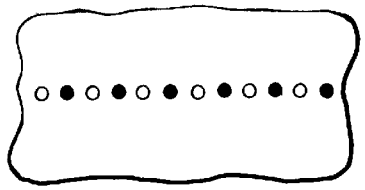

5,880,757

PRINT RESOLUTION ENHANCEMENT BY ADJUSTING PRINTHEAD POSITION

This is a continuation in part of commonly assigned application Ser. No. 08/556,728, filed Nov. 13, 1995, incorporated herein by reference, which is a continuation of application Ser. No. 07/787,297, filed Nov. 4, 1991, now U.S. Pat. No. 5,488,397, incorporated herein by reference. This application also relates to commonly assigned U.S. Pat. No. 5,241,325, incorporated herein by reference.

BACKGROUND OF THE INVENTION

The subject invention is relates to ink jet printing apparatus, and more particularly to an ink jet printing apparatus that achieves print dot resolution that is finer than the resolution of the ink jet printing elements of the ink jet printing apparatus.

An ink jet printer forms a printed image by printing a pattern of individual dots at particular locations of an array defined for the printing medium. The locations are conveniently visualized as being small dots in a rectilinear array. The locations are sometimes called "dot locations," "dot positions," or "pixels". Thus, the printing operation can be viewed as the filling of a pattern of dot locations with dots of ink.

Ink jet printers print dots by ejecting very small drops of ink onto the print medium, and typically include a movable carriage that supports one or more printheads each having ink ejecting nozzles. The carriage traverses over the surface of the print medium, and the nozzles are controlled to eject drops of ink at appropriate times pursuant to command of a microcomputer or other controller, wherein the timing of the application of the ink drops is intended to correspond to the pattern of pixels of the image being printed.

An ink jet printhead includes an array of nozzles through which droplets of ink are fired. Typically, the distance along the media axis between adjacent nozzles, which is also called the nozzle pitch, is equal to the resolution dot pitch of the desired dot resolution (e.g., 1/600 inch for 600 dpi).

The quality of the printed images produced by an ink jet printer depends to a large degree on the resolution of the printer. Higher or finer resolution wherein the printed dots are more closely spaced produces provides for higher quality images. Higher or finer resolution can be achieved by decreasing the nozzle pitch; i.e., by increasing the nozzle density of the nozzle array. However, as the nozzle spacing becomes finer, the manufacture of nozzle arrays becomes more difficult and the operation of the nozzle arrays becomes less reliable.

SUMMARY OF THE INVENTION

It would therefore be an advantage to provide a technique for achieving a print resolution that is finer than the resolution of the printing elements of an ink jet printing device.

The foregoing and other advantages are provided by the invention in an ink jet printer that includes a printhead having, a plurality of printing elements having a predetermined printing element dot pitch along a media axis, a movable print carriage for reciprocatingly scanning along a carriage scan axis, a positionally adjustable chute on the print carriage for holding the printhead, and a printhead positioning mechanism operatively connected to the printhead retaining chute for adjusting the position of the printhead relative to the media axis at the end of each scan of the carriage along the carriage axis, such that dots printed by the printing elements in a sequence of a first scan and a second scan of the print carriage are interleaved along the media axis and are separated along the media axis by one-half of the predetermined printing element dot pitch

BRIEF DESCRIPTION OF THE DRAWINGS

The advantages and features of the disclosed invention will readily be appreciated by persons skilled in the art from the following detailed description when read in conjunction with the drawing wherein:

FIGS. 6A and 6B are schematic plan views illustrating the operation of a printhead position adjusting cam of the printer of FIG. 1.

FIG. 7 is a schematic elevational view illustrating the change in print area effected by the printhead positioning cam of the printer of FIG. 1.

FIG. 8 is a schematic illustration of a column of dots printed by the printer of FIG. 1.

DETAILED DESCRIPTION OF THE DISCLOSURE

Figure 1:
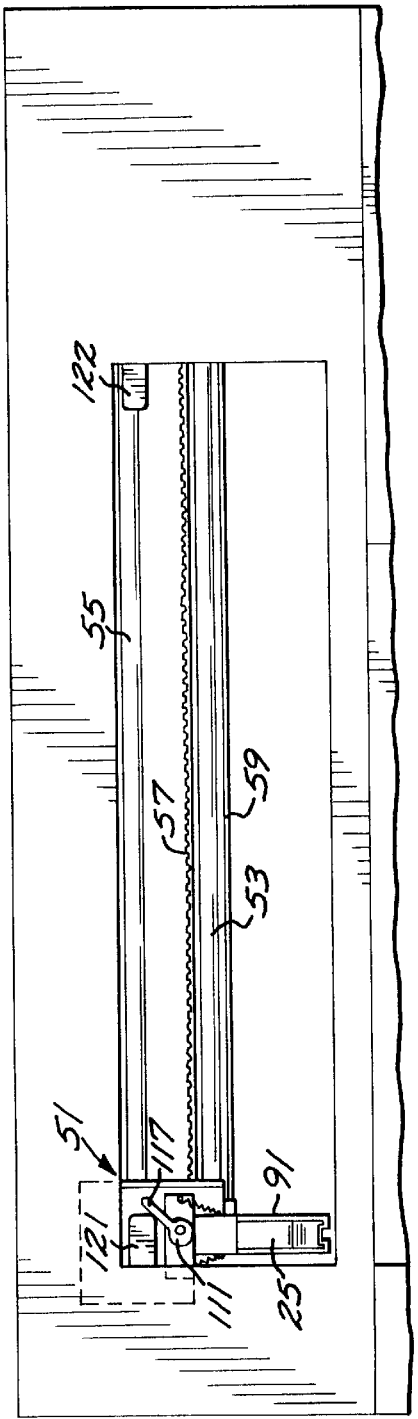
FIG. 1 is a simplified schematic of an ink jet printer that implements a resolution doubling printhead positioning mechanism in accordance with the invention.

In the following detailed description and in the several figures of the drawing, like elements are identified with like reference numerals.

Referring now to FIG. 1, set forth therein is a schematic top plan view depicting, by way of illustrative example, major mechanical components of a swath type multiple ink jet printer employing a resolution doubling printhead positioning system in accordance with the invention. The printer includes a movable carriage 51 mounted on guide rails 53, 55 for reciprocating translational movement or scanning along a carriage scan axis. The carriage 51 is driven along the guide rails 53, 55 by an endless belt 57 which can be driven in a conventional manner, and a linear encoder strip 59 is utilized to detect position of the carriage 51 along the carriage scan axis, for example in accordance with conventional techniques.

The print carriage 51 supports a printhead cartridge retaining chute 91 which retains a removable ink jet printhead cartridge 25 (sometimes called a "pen," "print cartridge," or "cartridge"). The printhead cartridge 25 includes a printhead having downwardly facing nozzles for ejecting ink generally downwardly to a print media 61 that is conventionally advanced along a media scan axis.

Figure 2:
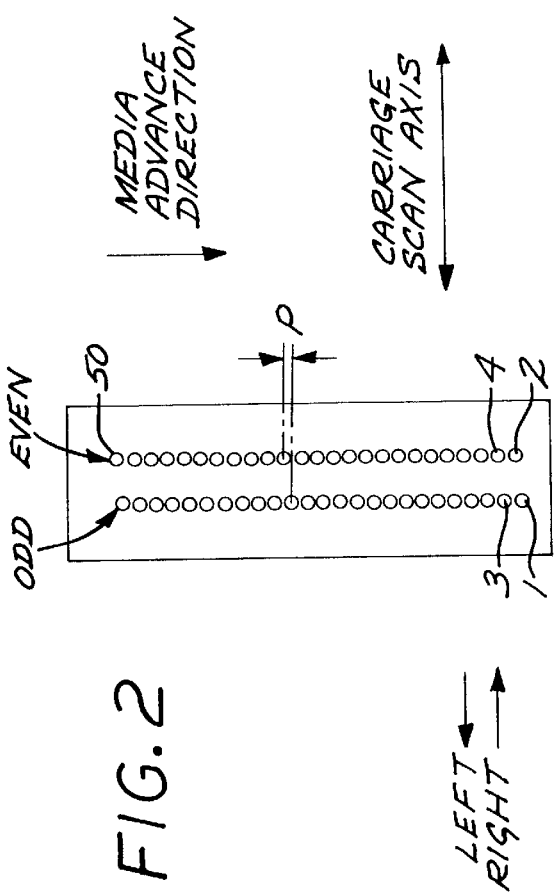
FIG. 2 is a schematic plan view illustrating the nozzle array of the printhead cartridge of the printer of FIG. 1.

FIG. 2 schematically depicts the arrangement of the nozzle array of the printhead of the cartridge 25 as viewed from above the nozzles of the cartridge (i.e., the print media would be below the plane of the figure). Each nozzle array includes an even number of nozzles arranged in two columns wherein the nozzles of one column are staggered relative to the nozzles of the other column. By way of illustrative example, each nozzle array is shown as having 50 nozzles which are numbered as (1) through (50) starting at the lower end of the nozzle array with nozzles in the left column being the odd numbered nozzles and the nozzles in the right column being the even numbered nozzles. The distance along the media scan axis between diagonally adjacent nozzles, as indicated by the distance P in FIG. 2 is known as the nozzle pitch. In use, the physical spacing between the columns of nozzles of a printhead is compensated by appropriate data shifts in the swath print data so that the two columns function as a single column of nozzles.

Figure 3:
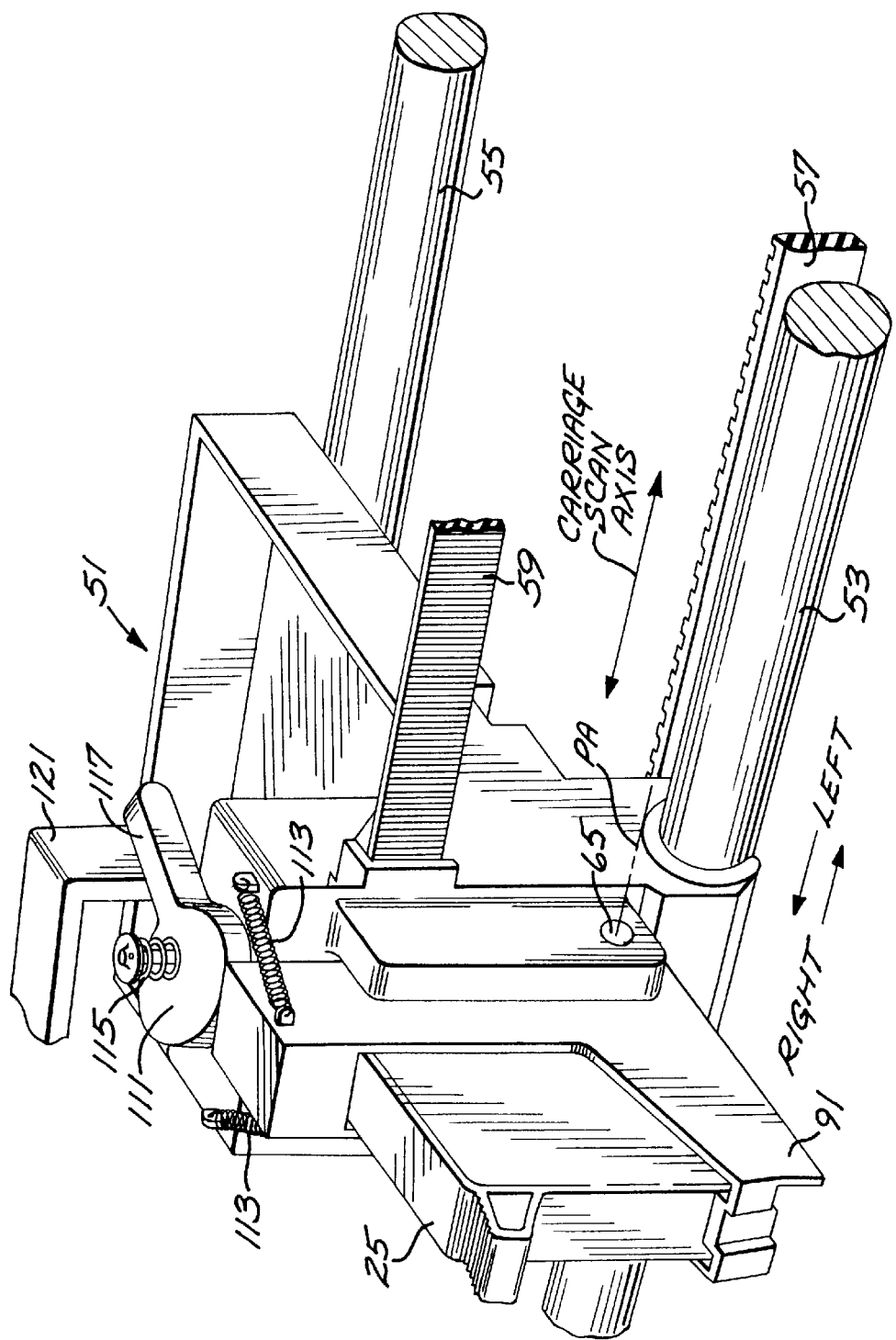
FIG. 3 is a schematic perspective view of the print carriage of the printer of FIG. 1.
Figure 4:
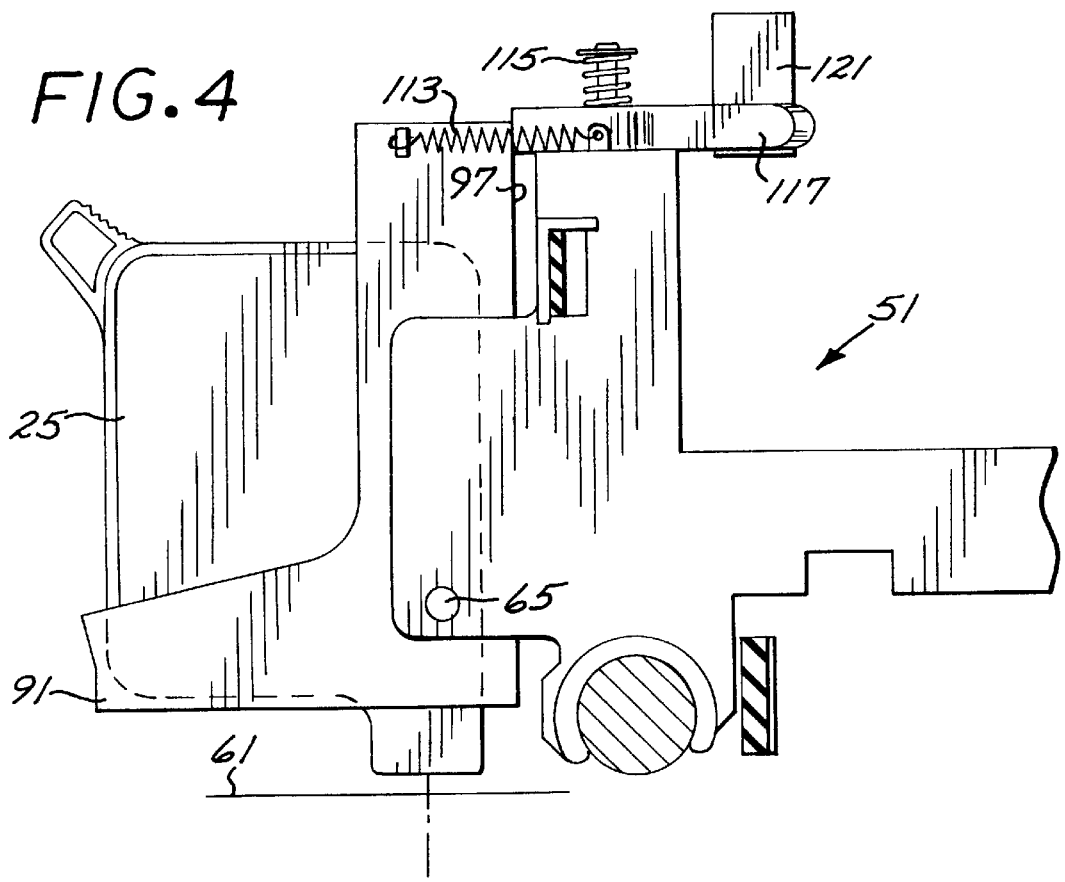
FIG. 4 is a schematic elevational view of the print carriage of the printer of FIG. 1.
Figure 5:
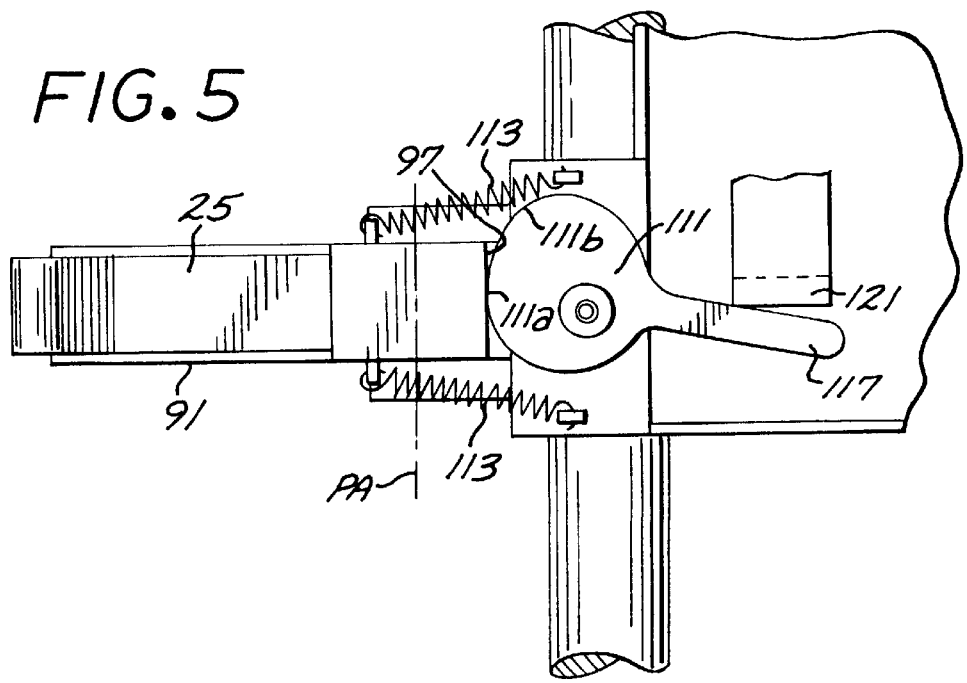
FIG. 5 is a schematic plan view of the print carriage of the printer of FIG. 1.

Referring now to FIGS. 3–5, the chute 91 that removably supports the printhead cartridge 25 is pivotally attached to the print carriage 51 so as to be pivotable about a pivot axis PA that is parallel to the carriage scan axis and located in the proximity of the lower portion of the printhead cartridge 25, for example by pins 65. An upper rear surface 97 of the cartridge retaining chute 91 comprises a cam follower surface that is biased rearwardly against a position adjustment cam 111 by a pair of retaining springs 113 which are connected between the top of the carriage 51 and the top of the cartridge retaining chute 91.

The adjustment cam 111 is rotatably mounted on a pin 115 on the carriage 51 and includes two dwell surfaces 111a, 111b of different radii, described more fully herein, which when engaged against the cam follower surface 97 of the retaining chute locates the printhead cartridge and the nozzle array thereof at respective rotational positions about the pivot axis PA. The adjustment cam 111 is rotated by a cam lever 117 that is integral with the adjustment cam 111. For reference, the cam lever 117 is considered to be centered when it is aligned front to back with the media axis. When the cam lever 117 is rotated clockwise relative to being centered, it is considered to be right or clockwise of center; and when the cam lever 117 is rotated counterclockwise relative to being centered, it is considered to be left or counterclockwise of center.

Referring more particularly to FIGS. 6A and 6B, the adjustment cam is configured such that the dwell surface 111a of the cam 111 is against the cam follower surface 97 of the cartridge retaining chute 91 when the cam lever has been rotated clockwise or right of the center position, and the dwell surface 111b of the cam 111 is against the cam follower surface 97 of the cartridge retaining chute 91 when the cam lever has been rotated counterclockwise or left of the center position.

Referring also to FIG. 7, when the dwell surface 111a of the cam 111 is against the cam follower surface 97 of the cartridge retaining chute 91, the printhead cartridge 25 (FIG. 7) is in a first rotational position about the pivot axis PA that causes ink drops to be directed to a first ink drop location A (FIG. 7). When the second dwell surface 111b of the cam 111 is against the cam follower surface 97 of the cartridge retaining chute 91, the printhead cartridge 25 (FIG. 7) is in a second rotational position about the pivot axis PA that causes ink drops to be directed to a second ink drop location B (FIG. 7). For an illustrative example wherein the first dwell surface 111a has a constant radius R1 that is less than the constant radius R2 of the second dwell surface 111b, the first ink drop location A (FIG. 7) is displaced in the media advance direction relative to the second ink drop location B (FIG. 7). In accordance with the invention, the radii R1, R2 of the first and second dwell surfaces 111a, 111b are configured such that the distance between the first and second ink drop locations is one-half of the nozzle pitch P (FIG. 2) of the nozzle array of the printhead cartridge 25 (FIG. 7).

It should be appreciated that since ink drops are actually deposited over a region, the ink drop locations A, B (FIG. 7) can be considered as reference locations in the respective regions over which ink drops are deposited, or they can be considered as the locations of drops fired from a selected nozzle of the nozzle array.

Referring also to FIG. 1, stationary cam lever actuating stops 121, 122 are located at the ends of a carriage path travelled by the print carriage 51 as it is reciprocatingly scanned along the carriage axis. The cam lever actuating stop 121 is encountered by the cam lever 117 at the end of the left going scan of the print carriage 51, which causes the cam 111 to rotate in the clockwise direction as viewed from above such that the first dwell surface 111a is against the cam follower surface 97 of the cartridge retaining chute 91. The cam lever actuating stop 122 is encountered by the cam lever 117 at the end of the right going scan of the print carriage 51, which causes the cam 111 to rotate in the counterclockwise direction as viewed from above such that the second dwell surface 111b is against the cam follower surface 97 of the cartridge retaining chute 91.

Thus, when the print carriage is being scanned to the right after the cam 111 has been rotated clockwise by engagement of the cam adjustment lever 117 against the cam lever actuating stop 121 pursuant to scanning of the carriage 51 to the left, ink drops are deposited at the location A (FIG. 7). When the print carriage is being scanned to the left after the cam 111 has been rotated counterclockwise by engagement of the cam adjustment lever 117 against the second cam lever actuating stop 122 pursuant to scanning of the carriage 51 to the right, ink drops are deposited at the location B (FIG. 7). Since the first and second dwell surfaces 111a, 111b are configured so that the print locations A and B are spaced apart along the media axis by one-half the nozzle pitch of the nozzle array of the printhead cartridge 25, it follows that the dots printed pursuant to such right going carriage scan and such left going scan without a media advance between scans are interleaved as schematically shown in FIG. 8 for a single column of dots wherein the solid dots represent dots printed at the print location A while the hollow dots represent dots printed at the print location B. Further, the dots printed pursuant to such a bidirectional scan have a dot pitch that is one-half the nozzle pitch of the nozzle array of the printhead cartridge 25, which is twice the resolution of the nozzle array of the printhead cartridge. In this manner, each swath is printed pursuant to two scans in opposite directions, and the print media is advanced after such two scans. The media advance is equal to the nozzle pitch multiplied by the number of active nozzles.

Thus, in accordance with the invention, the cam 111 is rotated at the end of each pass of the print carriage 51 so that the printhead cartridge is positioned at a first rotational position about the pivot axis PA at the end of a carriage scan in a first direction and at a second rotational position at the end of a carriage scan in a second direction which is opposite the first direction. The change in rotational position of the printhead cartridge changes the trajectory of the ink drops emitted thereby, which changes the location along the media axis of the print area of the printhead cartridge. Effectively, rotation of the printhead cartridge about the pivot axis PA, which is parallel to the carriage scan axis, changes the position of the printhead cartridge along the media axis. The radii R1, R2 of the dwell surfaces 111a, 111b are selected such that the change in the trajectory of the ink drops as between the first rotational position of the printhead cartridge and the second rotational position of the printhead cartridge is one-half the nozzle pitch of the nozzle array of the printhead cartridge 25. In this manner, a printed dot pitch of one-half the nozzle pitch can be achieved by maintaining the print media stationary between a carriage scan in the first direction and a subsequent scan in the second direction.

The foregoing has thus been disclosure of an printer wherein print resolution is increased relative to the ink jet nozzle array resolution by a mechanism that adjusts the position of the nozzle array for each carriage scan.

Although the foregoing has been a description and illustration of specific embodiments of the invention, various modifications and changes thereto can be made by persons skilled in the art without departing from the scope and spirit of the invention as defined by the following claims.

What is claimed is:

1. A printer comprising:
    a printhead having a plurality of printing elements having a predetermined printing element dot pitch along a media axis;
    a movable print carriage for reciprocatingly scanning along a carriage scan axis, wherein dots printed in a scan of said carriage along the carriage axis are separated along the media axis by the predetermined printing element dot pitch;
    positionally adjustable mounting means on said print carriage for holding said printhead; and
    printhead positioning means operatively connected to said mounting means for adjusting a position of said printhead along the media axis at an end of each scan of said carriage along the carriage axis, such that dots printed by the plurality of printing elements in a sequence of a first scan and a second scan of the print carriage are interleaved along the media axis and are separated along the media axis by one-half of the predetermined printing element dot pitch.

2. The printer of claim 1 wherein said printhead positioning means comprises:
    adjustment means for adjusting the position of said printhead so as to control a position of said printing elements along the media axis;
    a first actuating means located at a first end of a carriage path for engaging said adjustment means at the end of each scan of said print carriage that ends at said first end; and
    a second actuating means located at a second end of the carriage path for engaging said adjustment means at the end of each scan of said print carriage that ends at said second end.

3. The printer of claim 2 wherein said adjustment means includes:
    a cam rotatable about a cam axis that is fixed relative to the printhead carriage for engaging said positionally adjustable mounting means and causing said positionally adjustable mounting means to move relative to the carriage pursuant to rotation of the cam about said cam axis; and
    a cam lever fixedly attached to said cam.

4. The ink jet printer of claim 3 wherein said first actuating means causes said cam to rotate in a first direction and said second actuation means causes said cam to rotate in a second direction.

5. The printer of claim 4 wherein actuating means comprises a first stationary projection located at one end of the carriage path for engagement by said cam lever, and a second stationary projection at another end of the carriage path for engagement by said cam lever.

6. The printer of claim 5 wherein said positionally adjustable mounting means includes a position adjustment axis that is parallel to the carriage scan axis, and wherein said positionally adjustable mounting means is rotatable about said position adjustment axis.

7. A method of operating a printer including a printhead having a plurality of printing elements spaced apart by a predetermined printing element dot pitch along a media axis, the method comprising the steps of:
    positioning the printhead at a first position along the media axis;
    moving the printhead along a carriage axis with the printhead at the first position alone the media axis and printing first dots with the plurality of printing elements, said first dots being separated along the media axis by the predetermined printing element dot pitch;
    positioning the printhead at a second position along the media axis, the second position being selected such that dots printed with the printing elements with the printhead at the second position will be interleaved along the media axis with the dots printed with the printhead at the first position and dots printed with the printhead at the first position and dots printed with the printhead at the second position will be separated along the media axis by one-half of the predetermined printing element dot pitch; and
    moving the printhead along the carriage axis with the printhead at the second position alone the media axis and printing second dots with the printing elements, said second dots being separated along the media axis by the predetermined printing element dot pitch;
    whereby the first dots and the second dots form a dot pattern that includes dots that are separated along the media axis by one-half the predetermined printing element dot pitch.

8. The method of claim 7 wherein the step of positioning the printhead at the first position includes the step of positioning the printhead at a first rotational position about a pivot axis that is parallel to the carriage scan axis, and wherein the step of positioning the printhead at a second position includes the step of positioning the printhead at the second rotational position about the pivot axis.

* * * * *

UNITED STATES PATENT AND TRADEMARK OFFICE
CERTIFICATE OF CORRECTION

PATENT NO    :    5,880,757

DATED        :    Mar. 9, 1999

INVENTOR(S)  :    Chuong C. Ta

It is certified that error appears in the above-identified patent and that said Letters Patent is hereby corrected as shown below:

At Column 6, line 24, delete "alone" and insert in lieu thereof --along--.

At Column 6, line 40, delete "alone" and insert in lieu thereof --along--.

Signed and Sealed this

Eighth Day of June, 1999

Attest:

Q. TODD DICKINSON

*Attesting Officer*    *Acting Commissioner of Patents and Trademarks*